Nov. 12, 1963  J. W. COWLING  3,110,133
MACHINE TOOLS
Filed July 6, 1961  2 Sheets-Sheet 1
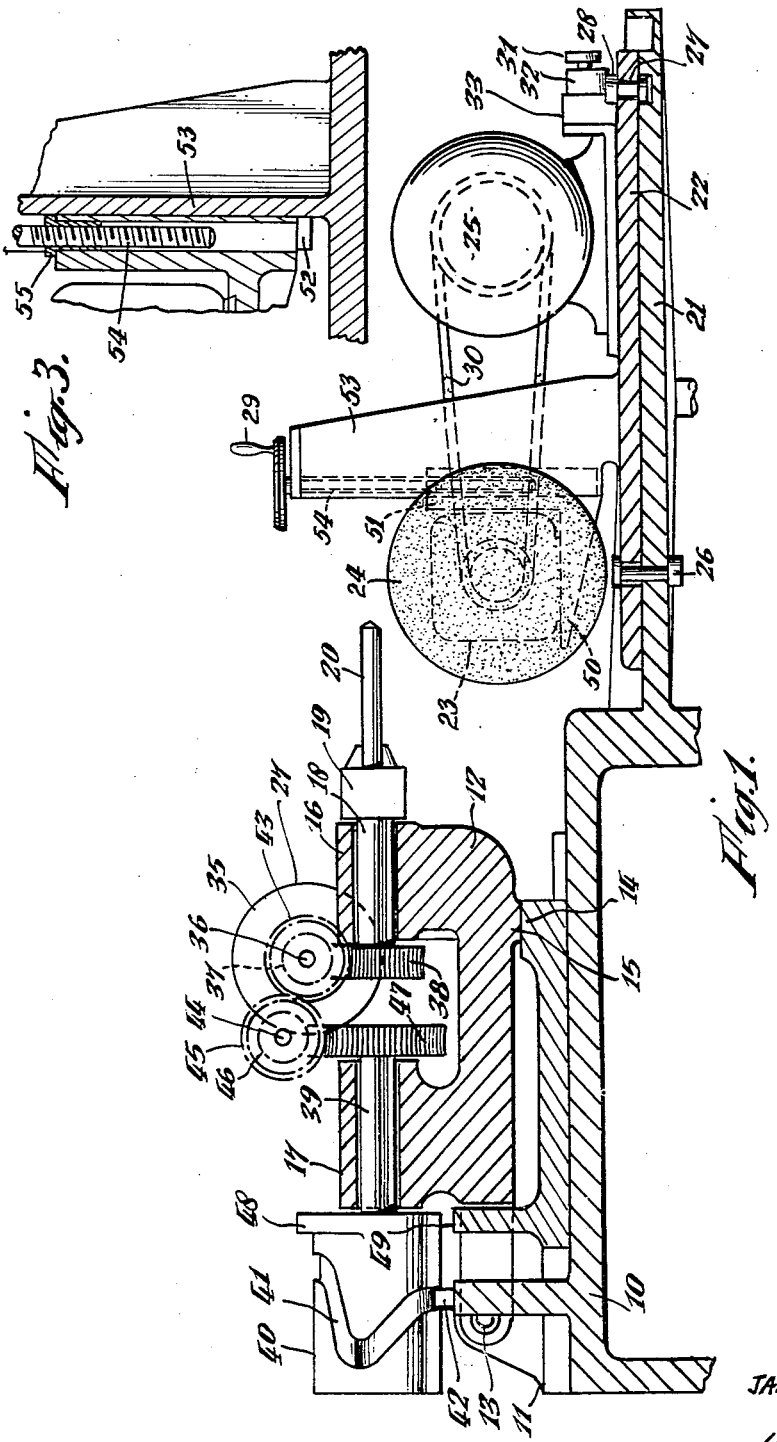
INVENTOR
JAMES W. COWLING
By H. Goodm
ATTORNEY

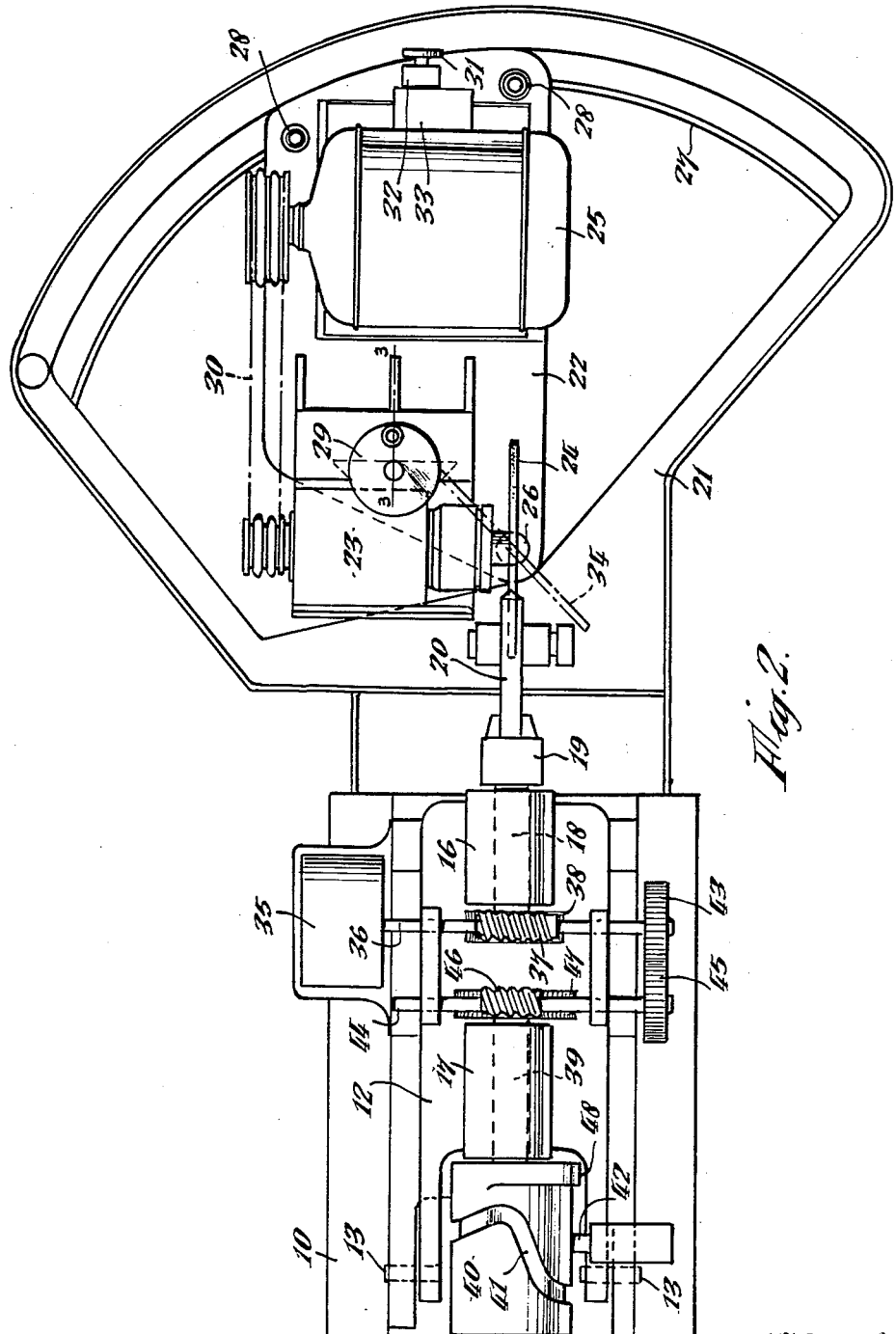

United States Patent Office 3,110,133
Patented Nov. 12, 1963

3,110,133
MACHINE TOOLS
James William Cowling, Dronfield, England, assignor to Arthur Balfour & Company Limited, Sheffield, England, a company of Great Britain and Northern Ireland
Filed July 6, 1961, Ser. No. 122,351
8 Claims. (Cl. 51—95)

This invention relates to machines of the kind adapted to form helical grooves in the surfaces of round bars (hereinafter referred to as workpieces) and in particular to machines adapted to form a succession of two or more such helical grooves in a workpiece in the substantially uniformly displaced phase relationship that is commonly described as a multi-start relationship.

One use of such a machine tool is the cutting of helical grooves, commonly known as flutes, in engineers' twist drills by subjecting a rotating workpiece to a rotary grinding operation in which the surface of the workpiece is contacted by the periphery of a grinding wheel and forms each flute complete in a single one-pass operation, the workpiece usually having previously been hardened to a degree of hardness such that no further hardening of the material is required for the production of the finished drill.

In such machine tools for forming the helical flutes in twist drills it is essential to produce a device which will function to produce a controlled relative motion between the rotating grinding wheel and the workpiece in which the flutes are being formed, the said motion being a combination of two distinct elements of which one is a straight longitudinal movement along the axis of the workpiece and the other is a rotary motion around the axis of the workpiece. It is the combination of these two motions that gives the flutes the desired helical characteristic. It is also essential to incorporate some device that will enable the successive flutes in one drill to be produced in a substantially predetermined angular phase relationship one with the other. This said device is commonly designated the "dividing mechanism" or "indexing mechanism."

According to the present invention there is provided a machine for forming helical flutes in a workpiece of round cross section which comprises, a rotatable holder for the workpiece, a grinding wheel pivotally adjustable about an axis perpendicular to the axis of said rotatable workpiece holder, means for imparting to the workpiece holder successive cycles of reciprocating axial motion in which each forward stroke of said reciprocation is substantially of uniform velocity and the return stroke is of greater velocity, gearing interconnecting the rotatable workpiece holder and the means for imparting the said reciprocation, a driving unit for the gearing, said driving unit being subjected to continuous rotation in one direction and said gearing being adapted to produce a phase displacement between the rotation of the workpiece holder and its reciprocating motion on each successive cycle of said reciprocation by reason of the said gearing imparting a rotation of the workpiece holder through a predetermined angle other than 360° during each complete cycle of said reciprocation, the whole combined so as to impart to the workpiece holder a combined rotary reciprocating motion relative to the periphery of the grinding wheel for the formation by said grinding wheel of separate helical flutes successively in a workpiece carried by the workpiece holder, and means being provided for holding the workpiece clear of the grinding wheel during the return stroke of the workpiece holder.

The rotatable workpiece holder and the means for reciprocating said workpiece holder together with the gearing and driving unit for said gearing may be mounted on a slidable and tiltable carriage, said carriage being adapted to be slidably reciprocated by and on operation of the reciprocating means, and means being provided for tilting the carriage upwardly during its return stroke so as to hold the workpiece clear of the grinding wheel.

Preferably, the grinding wheel is mounted below the workpiece so that it can be pivotally adjusted thereunder about the vertical axis of its pivot and below the axis of the workpiece in order to provide for the grinding of lefthand or righthand helical flutes as required, the driving unit for the worm and wormwheel drives being reversible.

The invention will now be described with reference to the accompanying diagrammatic drawings in which:

FIG. 1 is a partly sectioned side elevation of one form of machine tool in accordance with this invention for forming helical flutes in twist drills.

FIG. 2 is a plan view of FIG. 1.

FIG. 3 is a fragmentary detailed sectional view showing mechanism for adjusting the grinding wheel relative to the workpiece holder, said view being taken substantially on the line 3—3 of FIG. 2.

Referring to the drawings, the machine tool comprises a rigid, fixed supporting frame 10 on the upper surface of which a slide 11 is longitudinally slidable in dovetail guides (not shown) of known form. The slide 11 supports a carriage 12, which is pivoted at its rear end to the slide by means of transverse hinge pins 13 and is supported at its forward end by pads 14 of the slide, upon which feet 15 of the carriage can rest. The carriage has front and rear bearings 16, 17, respectively, arranged in line on a longitudial axis. Front bearing 16 carries a shaft 18 for operating a chuck 19 holding a workpiece 20 on the forward end of the shaft.

The forward end of the frame 10 is extended to provide a platform 21 for a table 22 supporting a mounting 23 carrying a grinding wheel 24 and electric driving motor 25 therefor. The table 22 is pivotally adjustable horizontally upon the platform about a vertical pivot 26 thereon whose axis is perpendicular to and joins the axis of the workpiece. The grinding wheel 24 is so disposed on the table 22 that its horizontal axis lies beneath the workpiece for the periphery of said grinding wheel to be presented thereto for grinding action thereupon. The axis of the grinding wheel passes through the axis of the pivot 26 so that said grinding wheel can be adjusted by means of the table 22 to bring the plane of the grinding wheel at the required angle across the axis of the workpiece for grinding right or lefthand flutes therein as desired by merely adjusting the table 22 about the pivot 26.

For securing the table 22 in the desired position of adjustment for positioning the grinding wheel 24 relative to the workpiece 20, a slot 27 is provided in the platform 21 at a radius to the pivot 26 and one or more securing bolts 28 pass through the table and into engagement with the slot 27.

The mounting 23 for the grinding wheel 24 is supported by the arm 50 of a bracket 51 which bracket is of dovetail shape in cross section and carried in dovetailed guides 52 on the vertical face of a column 53 upstanding from the platform 22 whereby said bracket can be slidably positioned for raising or lowering the mounting 23 so as to permit adjustment, in height, of the grinding wheel 24 relative to the chuck 19 and the workpiece 20. Slidable movement of the bracket 51 is effected by means of a handwheel 29 secured to the upper end of a vertical rotatable adjusting screw 54, which traverses a nut 55 thereon which nut is non-rotatably carried by the bracket 51.

The grinding wheel 24 is driven by belt drive 30 from the eletcric motor 25 which is adjustable on the table 22 by adjusting screw 31 passing through an upstanding lug 32 thereon into screw thread engagement with the baseplate 33 of the motor 25.

Broken lines 34 in FIG. 2 show a possible position of the grinding wheel 24 for the formation of a right-hand helix in the workpiece.

The shaft 18 for rotating the workpiece 20 is driven from a hydraulic motor 35 mounted on the carriage 12, through a spindle 36 carrying a worm 37 which engages with a wormwheel 38 fixed to the rear end of the shaft 18. By this means the workpiece 20 is given a rotational motion.

Longitudinal motion of the workpiece is controlled by the rotation in the rear bearing 17 of a shaft 39 and its associated cam 40. A cam groove 41 is formed in the cylindrical surface of the cam and a follower 42, fixed to the frame 10, engages said groove. Rotation of the cam 40 will, therefore, cause the slide 11 and the tiltable carriage 12 pivoted thereto at 13 to reciprocate on the frame 10. Interconnecting driving means are provided between the shafts 18, 39, to control the resultant helical motion of the workpiece 20, the worm spindle 36 extending across the carriage 12 and having attached to its free end a first spur gear 43. A spindle 44, parallel to the worm spindle 36 carries a second spur gear 45 meshing with the first gear 43 and by means of worm 46 and wormwheel 47 it rotates the shaft 39.

It will be seen from the drawing that the cam groove 41 is arranged so that a relatively slow uniform translatory motion is given to the workpiece during the forward stroke and that this is followed by a relatively rapid return stroke. The machine tool is so arranged that the workpiece is presented to the grinding wheel only during the forward stroke of its reciprocating motion, an auxiliary cam 48 being arranged to contact an abutment 49, fixed to the frame 10, during the return stroke and thereby tilt the carriage upwards about its hinge 13 with the slide 11 and so lift the workpiece clear of the grinding wheel. The position of the cam 40 adjacent the hinge 13 means that the follower 42 will not become unseated when the carriage is tilted although the cam surface can be built up to prevent any reduction of the bearing area between it and the follower during this part of the motion.

The spur gears 43, 45, of the intermediate driving means are arranged to be readily replaceable so that the ratio of the rotation of the shafts 18, 39, can be changed easily. This enables the angular phase relationships of successive flutes in the workpiece and/or the total number of revolutions of the workpiece for each reciprocatory cycle to be altered as desired, e.g. for one form of two-start relationship, the ratio of rotation of the shafts 18, 39, is set at 3:2 so that for each reciprocatory cycle the workpiece rotates through 540°, i.e. one and a half revolutions, and the second flute of the pair will automatically be formed 180° out of phase with the first.

It will be convenient in the following examples to assume that the intermediate driving means is so designed that this ratio of 3:2 for the rotation of the shafts 18, 39, is achieved by having the ratio of the gears 43, 45, at unity. In this case, other particularly useful two-start ratios can be built up using gear ratios of 3:5, 3:7 and 1:3. The numbers of teeth of the gears 43 and 45, respectively, for each of the four ratios can then be 20 and 20, 15 and 25, 12 and 28, 12 and 36. Each pair of gears can be arranged to operate at the same gear centres distance using only two sizes of gear tooth such as the sizes known as 10 DP and 12 DP, the second size being necessary only for the last ratio enumerated. The ratios quoted would give rotations of the workpiece of 540°, 900°, 1260° and 1620°, respectively, per reciprocatory cycle. In each case the rotation is 180° greater than a particular number of complete revolutions.

By other changes of the ratio of the two spur gears it is possible to form other multi-start grooves in a workpiece. As an example of this, if the numbers of teeth on the gears 43 and 45 are 18 and 40 respectively, the workpiece will be rotated through 1200°, i.e. three and one third revolutions each reciprocatory cycle and one form of three-start relationship will thus be provided. Similarly, for a four-start relationship, a ratio of 12 to 26 teeth will give three and a quarter revolutions per cycle; for a five-start relationship, a ratio of 15 to 32 teeth will give three and one fifth revolutions per cycle and for a six-start relationship, a ratio of 18 to 38 will give three and one sixth revolutions per cycle.

Other ratios than those enumerated may, of course, be made up as desired. In the case of unusually long drills on which the total length of each flute is required to be substantially greater than three times the lead of the flute pitch it is necessary to rotate the workpiece through at least four complete revolutions, plus the angle required to produce the required phase difference, for each reciprocatory cycle. The examples given above, however, are sufficient to indicate how any desired flute or groove formation can be achieved.

So that pairs of spur gear wheels having the required numbers of teeth can be used at one fixed centres distance, it may be found convenient to provide at least some of the pairs with helical rather than straight spur teeth if this will end to facilitate the economical production of the gears from the standard means available to gear wheel manufacturers.

A machine tool according to the invention can be arranged to form both lefthand and righthand helices. To adapt the illustrated embodiment to form a left hand helix the inclination of the axis of the grinding wheel 24 to the workpiece axis and the rotation of the hydraulic motor 35 are reversed and the cam 40 is replaced by a similar but oppositely handed cam.

What I claim is:

1. A machine tool for forming helical flutes in a workpiece of round cross section comprising, a rotatable workpiece holder, a grinding wheel pivotally adjustable about an axis perpendicular to the axis of said rotatable workpiece holder, means for imparting to the workpiece holder successive cycles of reciprocating axial motion in which each forward stroke of said reciprocation is substantially of uniform velocity and the return stroke is of greater velocity, gearing interconnecting the rotatable workpiece holder and the means for imparting the said reciprocation, a driving unit for the gearing, said driving unit being subjected to continuous rotation in one direction and said gearing being adapted to produce a phase displacement between the rotation of the workpiece holder and its reciprocating motion on each successive cycle of said reciprocation by reason of the said gearing imparting a rotation of the workpiece holder through a predetermined angle other than 360° during each complete cycle of said reciprocation, the whole combined so as to impart to the workpiece holder a combined rotating and reciprocating motion relative to the periphery of the grinding wheel for the formation by said grinding wheel of separate helical flutes successively in a workpiece carried by the workpiece holder, and means being provided for holding the workpiece clear of the grinding wheel during the return stroke of the workpiece holder.

2. A machine tool for forming helical flutes in a workpiece of round cross section comprising, a rotatable holder for the workpiece, a grinding wheel pivotally adjustable about an axis perpendicular to the axis of the workpiece holder and driving means for said grinding wheel, means for reciprocating the workpiece holder, gearing in interconnecting driving engagement with the rotatable workpiece holder and said reciprocating means and a driving unit for the gearing, said reciprocating means being adapted on continuous rotation of the gearing by said driving unit to impart to said workpiece holder successive cycles of reciprocating motion in which the return stroke of said reciprocation is more rapid than the forward stroke thereof, the gearing being adapted to produce a phase displacement between the rotation of the workpiece holder and the reciprocation thereof on each successive cycle of said reciprocation, said phase displacement being produced by said gearing effecting rotation of the workpiece holder through a predetermined angle other than 360° during each cycle of reciprocation thereof, the whole combined so as to impart to the workpiece holder and a workpiece therein a rotary reciprocating motion relative to the periphery of the grinding wheel for the formation by said grinding wheel of separate helical flutes successively in the workpiece and means being provided for holding the workpiece clear of the grinding wheel during the return stroke of the workpiece holder.

3. A machine tool for forming helical flutes in a workpiece of round cross section comprising, a frame, a slide mounted on the frame for reciprocatory movement along the frame and a carriage movable with said slide pivotally mounted by one end thereon for tilting movement, a rotatable workpiece holder and means for reciprocating said workpiece holder mounted on the carriage, a platform at one end of the frame, a grinding wheel and driving means therefor mounted on a table pivotally adjustable on said platform for adjusting the grinding wheel about an axis perpendicular to the axis of said workpiece holder, gearing in inter-connecting driving engagement with the rotatable workpiece holder and the reciprocating means and a driving unit for said gearing mounted on the carriage, said reciprocating means being adapted on continuous rotation of the gearing by said driving unit to impart to said workpiece holder successive cycles of reciprocating motion in which the return stroke of said reciprocation is more rapid than the forward stroke thereof, the gearing being adapted to produce a phase displacement between the rotation of the workpiece holder and the reciprocation thereof on each successive cycle of said reciprocation, said phase displacement being produced by said gearing effecting rotation of the workpiece holder through a predetermined angle other than 360° during each cycle of reciprocation thereof, the whole combined so as to impart to the workpiece holder and a workpiece therein a rotary reciprocating motion relative to the periphery of the grinding wheel for the formation by said grinding wheel of separate helical flutes successively in the workpiece and means for tilting the carriage to hold the workpiece clear of the grinding wheel during the return stroke of the workpiece holder.

4. A machine tool for forming helical flutes in a workpiece of round cross section comprising, a frame, a slide mounted on the frame for reciprocatory movement along the frame and a carriage movable with said slide pivotally mounted by one end thereon for tilting movement, a rotatable workpiece holder and means for reciprocating said workpiece holder, shafts mounted in forwardly and rearwardly spaced support bearings respectively on the carriage, a platform at one end of the frame, a grinding wheel and driving means therefor mounted on a table pivotally adjustable on said platform for adjusting the grinding wheel about an axis perpendicular to the axis of said workpiece holder, gearing in inter-connecting driving engagement with the rotatable workpiece holder and the reciprocating means and a driving unit for said gearing mounted on the carriage, said gearing comprising separate worm and wormwheel drives for said shafts interconnected by a pair of replaceable meshing pinions provided one on the shaft of each worm, the shaft carrying the worm for driving the workpiece holder being driven directly by the driving unit and the shaft carrying the worm for driving the reciprocating means being driven by the meshing pinions, said gearing being adapted to provide a rotation of the shaft carrying the workpiece at an angular velocity of 1½ times the angular velocity of rotation of the shaft carrying the reciprocating means, said reciprocating means being adapted on continuous rotation of the gearing by said driving unit to impart to said workpiece holder successive cycles of reciprocating motion in which the return stroke of said reciprocation is more rapid than the forward stroke thereof, the gearing being adapted to produce a phase displacement between the rotation of the workpiece holder and the reciprocation thereof on each successive cycle of said reciprocation, said phase displacement being produced by said gearing effecting rotation of the workpiece holder through a predetermined angle of 540° during each cycle of reciprocation thereof, the whole combined so as to impart to the workpiece holder and a workpiece therein a rotary reciprocating motion relative to the periphery of the grinding wheel for the formation by said grinding wheel of separate helical flutes successively in the workpiece, and means for tilting the carriage to hold the workpiece clear of the grinding wheel during the return stroke of the workpiece holder.

5. A machine tool as claimed in claim 4, characterised in that the wormwheel driven by the wormshaft for driving the rotatable workpiece holder produces the rotation of said workpiece holder through the angle of 540° and that the meshing pinions of the gearing are of equal size and have an equal number of teeth.

6. A machine tool as claimed in claim 4, characterised in that the wormwheel driven by the wormshaft for driving the rotatable workpiece holder produces the rotation of said workpiece holder through the angle of 540° and that the meshing pinions of the gearing are of unequal size to vary said angle and adapt the machine for use in cutting flutes of any predetermined length and any predetermined angular phase relationship.

7. A machine tool as claimed in claim 3, characterised in that the grinding wheel is disposed below the axis of the workpiece holder for adjustment across the axis of a workpiece therein for cutting righthand flutes or lefthand flutes in said workpiece.

8. A machine tool for forming helical flutes in a workpiece of round cross section comprising, a support frame, a slide mounted for reciprocation on the support frame, a carriage movable with the slide and pivotally mounted by one end thereon for rise and fall movement at its other end relative to said slide, co-axially aligned front and rear spaced apart bearings in the carriage, a rotatable workpiece holder mounted by a spindle in the front bearing on an axis parallel with the line of movement of the slide, a spindle in the rear bearing carrying rearwardly thereof cam mechanism for reciprocating the slide and for tilting the carriage on the return stroke thereof, co-axially spaced apart wormwheels of different diameters disposed between the bearings and in driving engagement the one with the shaft of the workpiece holder and the other with the shaft of the cam mechanism, separate wormshafts one for each wormwheel and a driving unit for one of said wormshafts, pinions on the wormshafts for transmitting motion from one wormshaft to the other, a grinding wheel pivotally adjustable about an axis perpendicular to the axis of the workpiece holder, means for adjusting the grinding wheel relative to the workpiece holder and means for rotating said grinding wheel.

References Cited in the file of this patent

UNITED STATES PATENTS

| | | |
|---|---|---|
| 230,715 | Penney | Aug. 3, 1880 |
| 2,407,577 | Rickenmann | Sept. 10, 1946 |